United States Patent [19]

Zetterberg

[11] 3,874,147
[45] Apr. 1, 1975

[54] DEVICE FOR GUIDING AND/OR PRELIMINARY TIGHTENING OF CAPS IN AN APPARATUS FOR CLOSING JARS OR OTHER CONTAINERS WITH CAPS

[76] Inventor: Einar Zetterberg, Professorsgatan 4B, 214 53 Malmoe, Sweden

[22] Filed: Jan. 24, 1973

[21] Appl. No.: 326,504

[30] Foreign Application Priority Data
Jan. 24, 1972 Sweden .................. 786/72

[52] U.S. Cl. .................. 53/314, 53/315
[51] Int. Cl. .................. B67b 3/20, B65b 7/28
[58] Field of Search .............. 53/313, 314, 315, 317, 53/331.5

[56] References Cited
UNITED STATES PATENTS

| | | | |
|---|---|---|---|
| 2,732,991 | 1/1956 | DeBastos et al. | 53/314 |
| 2,855,736 | 10/1958 | Harmon et al. | 53/313 X |
| 2,876,605 | 3/1959 | McElroy et al. | 53/317 X |
| 2,996,865 | 8/1961 | Hohl et al. | 53/315 |
| 3,054,234 | 9/1962 | Stover | 53/317 X |
| 3,438,174 | 4/1969 | Foss et al. | 53/317 X |

Primary Examiner—Travis S. McGehee
Assistant Examiner—Horace M. Culver
Attorney, Agent, or Firm—Burns, Doane, Swecker & Mathis

[57] ABSTRACT

Apparatus for closing containers such as jars with caps with a device for guiding the caps from a cap supply compartment utilizing spring biased guide pins having cylindrical parts which cooperate with an upper cap portion and guide heads in helping the maintain the caps horizontal. The guide members are arranged relative to a cam surface so that the edges of the cap will be controlled to properly position the cap so that during further passage of the container, the cap will be preliminarily tightened. After preliminary tightening, the cap is firmly tightened at a subsequent station in the apparatus.

4 Claims, 3 Drawing Figures

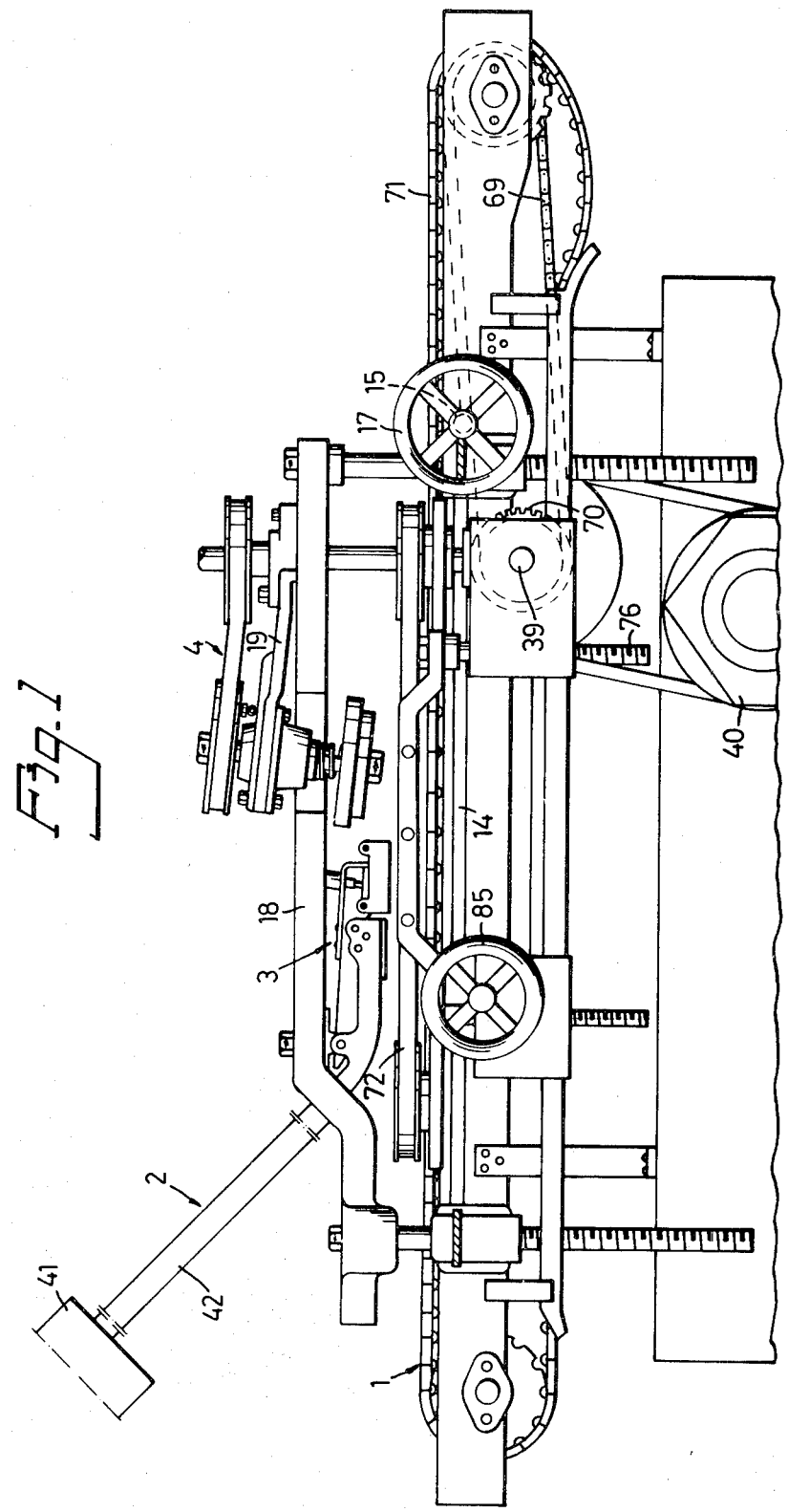

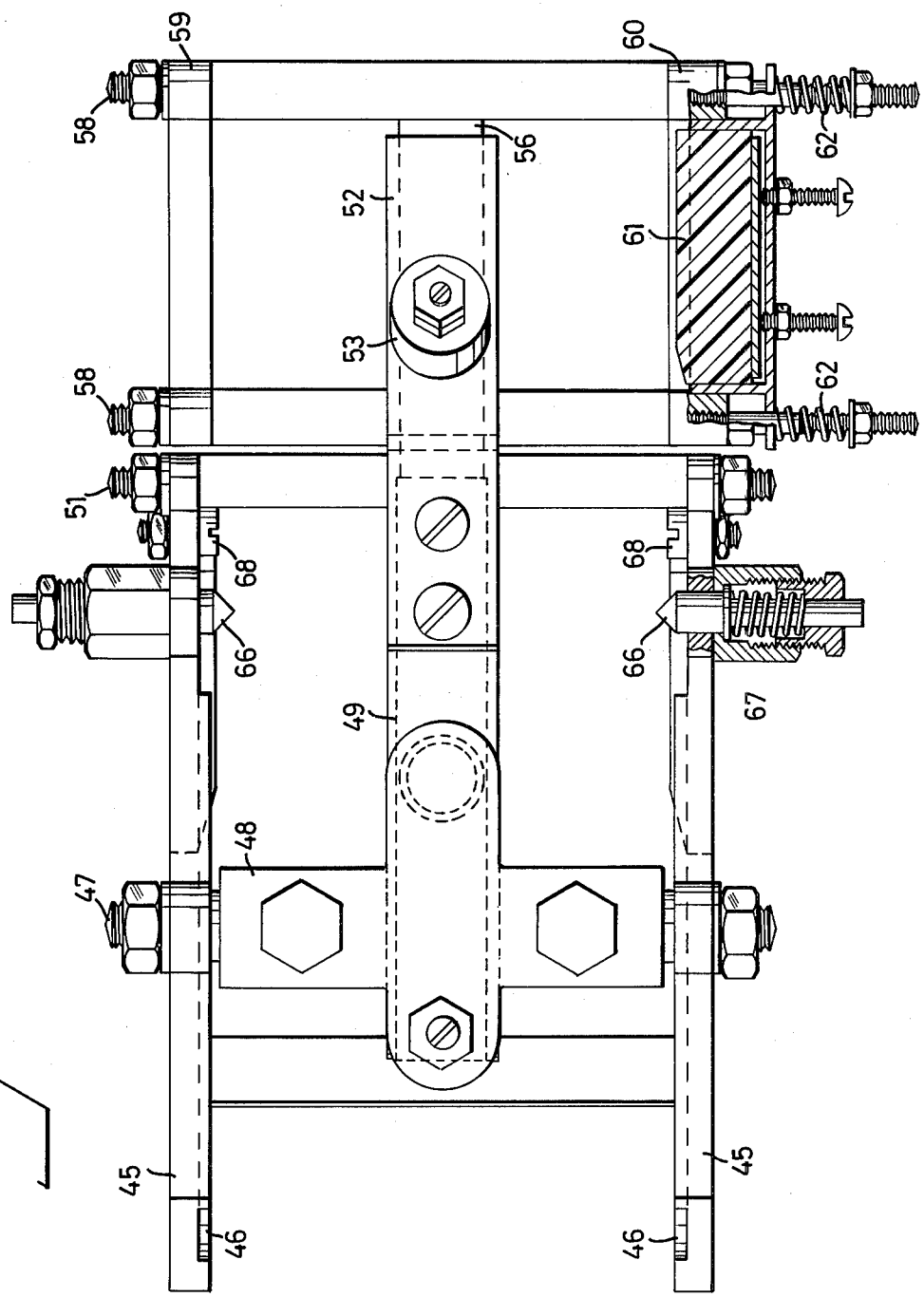

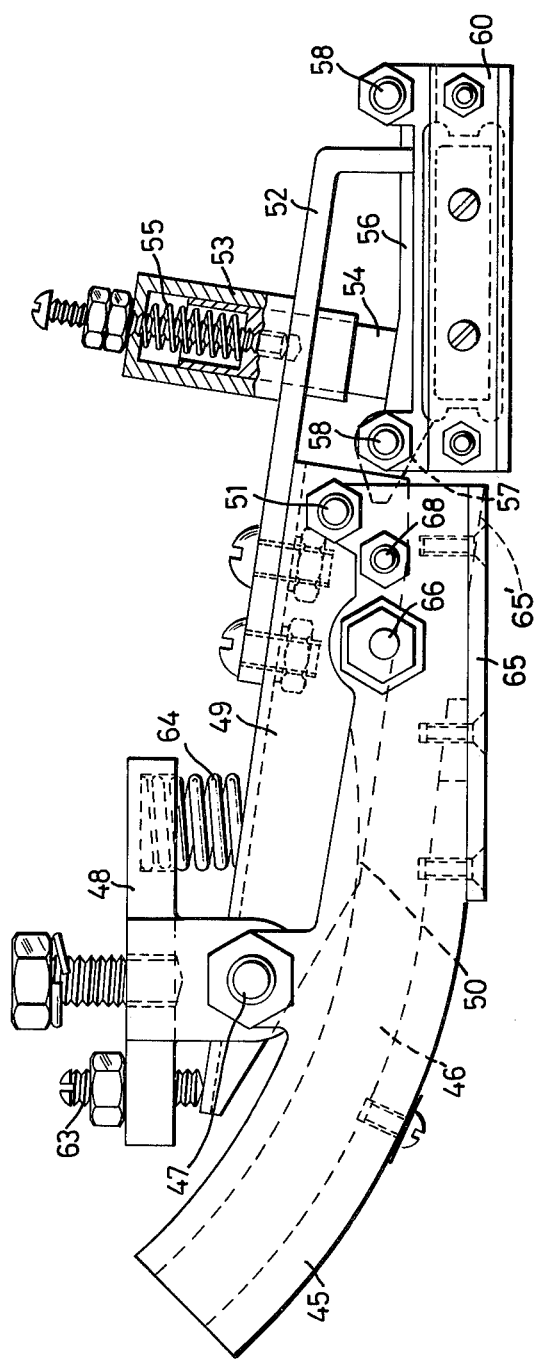

DEVICE FOR GUIDING AND/OR PRELIMINARY TIGHTENING OF CAPS IN AN APPARATUS FOR CLOSING JARS OR OTHER CONTAINERS WITH CAPS

The present invention relates to an apparatus for closing jars or other containers with caps, said apparatus comprising partly a conveyor of the feeding of filled jars through the apparatus, partly a device for the supply of caps to the apparatus from a cap container, and partly a device for the guiding and/or preliminary tightening of the caps, and partly a device for firmly tightening or final pressing on caps, which are located on the jars.

According to the invention, the device for guiding and/or preliminary tightening of the caps is furnished with cylindrical and conically pointed resiliently mounted stop and guide pins which are mounted opposite to each other and so arranged that the caps can pass between them. Said pins are combined with a guide shoulder, on which the caps at first slide, but fall off, whereby the guide pins spring inwardly so that their cylindrical parts cooperate with the upper part of the caps. Further, in the transport direction guide heads are arranged, the lower guide surfaces of which are levelled with the undersides of the cylindrical mantle surfaces of the guide pins, and where said guide heads help in keeping the caps horizontal. Further, in the continuation of guide rails, which support the guide pins and guide heads, guide members are arranged, said which are vertically firm relative to a cam surface, and where said cam surface is firmly connected to a pin, which action is displaceable upwards into a guiding sleeve against the action of a spring.

The invention is illustrated by an embodiment shown on the enclosed drawings as an example.

FIG. 1 shows schematically a side view of the apparatus according to the invention.

FIG. 2 shows a side view of a device for guiding and preliminary tightening of caps.

FIG. 3 shows the device of FIG. 2 as seen from above.

The apparatus according to FIG. 1 comprises partly a conveyor, which is generally indicated with 1, for the conveyance of filled jars in a line through the apparatus, partly a device, which is generally indicated with 2, for the supply of caps, partly a device, which is generally indicated with 3, for the guiding and preliminary tightening of caps, and partly a device, which is generally indicated with 4, for the firmly tightening of caps located on the jars. The device for firmly tightening caps is more fully described in my copending U.S. application Ser. No. 326,505, filed Jan. 24, 1973.

The device 2 for the supply of caps to the jars comprises a conventional cap container 41 and a cap chute 42, in which the caps, their bottom ends down, slide down, the mantle edges of which being downwards directed. According to FIGS. 2 and 3 the cap chute 42 is connected to a cap locating device comprising two parallel guide rails 45, having open guide grooves 46 facing each other, which guide the edges of the caps. The guide rails 45, accordingly, have a U-formed cross section, and are supported by a horizontal shaft pivot 47, which is journalled in bearings and within certain limits axially displaceable, for example 2–4 mm, in an attachment 48, being attached to a platform 18, which is vertically adjustable by a wheel 17. On the shaft pivot 47 a supporting arm 49 is also mounted with downwards projecting side flanges 50. The supporting arm 49 is further connected to the guide rails by a bolt 51, and on the supporting arm 49 a projecting arm 52 is mounted having a guide sleeve 53 for a pivot 54, which pivot is displaceable upwards against the action of a helical spring 55 in the guide sleeve 53. The pivot 54 can be made of a corrugated or in cross section polygon shaped material, the edges of which have been chamfered in order to reduce the contact surface against the surrounding guide sleeve 53. The inclination to stick or to bind, due to drying, calcareous deposits etc. will then be substantially reduced or wholly eliminated. At the lower free end of the pivot 54 an intermediate member 56 is arranged having an inclining cam surface 57 as shown in FIG. 3. The intermediate member 56 supports with bolts 58 a pair of guide members 59 and 60 being located in the continuation of the rails 45 and having a U-formed cross section, whereby the right guide member 60, as seen in the conveyance direction, is furnished with a friction member 61 for cooperation with the edge of each respective cap by the influence of helical springs 62, which are arranged on the bolts 58. The friction member 61 can be excluded if the apparatus is to be used for pressing on caps.

The guide rails 45, which are swingable around the shaft pivot 47 and the supporting arm 49, have an adjustable location in that the supporting arm on one side of the shaft pivot 47 rests on an adjusting screw 63 by the influence of a helical spring 64, which is arranged on the other side of said shaft pivot. At the part of the guide rails 45, which is adjacent to the guide members 59, 60, a guide plate 65 forms the underside of each respective rail 46 and the guide plate 65 is provided with a chamfered surface 65' at the end thereof adjacent guide members 59, 60. In the guide rails 45 at the top side of each respective groove 46 there is arranged a stop and guide pin 66 with a point and a cylindrical part, which pin is displaceable in the direction out of the groove 46 against the action of a helical spring 67. In level with each pin 66 there is arranged in each respective guide rail 45 a head 68, which in this case wholly is formed by the head of a screw. The stop and guide pins 66 and the heads 68 serve for keeping down the caps as will be closer described below.

The function of the device for guiding and preliminary tightening of caps is as follows. Filled jars are supplied preferably by some mechanical device to a conveyor 71, which is run by a motor 40 via a shaft 39, a sprocket 70 and the chain 69, on which conveyor the lined jars are moved in between and are seized by conventional side belts 72, which have the same speed and direction as the conveyor 71.

Caps are supplied from the cap container 41 through the cap chute 42 to the guide rails 45 and are stopped by the stop and guide pins 66 in the right position so that they with their downwards directed mantle edges are caught by a conveyed jar, whereafter the jar pulls the cap, which presses the pins 66 outwardly and after a movement of some millimeters ahead falls down in a horisontal position on the guide plates 65. Hereby the upper side of the cap will come in position under the cylindrical parts of the pins 66 and the heads 68, whereby the cap is prevented from raising. It occurs that there may be forces, among other things from the jar, which forces act as to bring the caps from their horisontal positions. A cap must not grip into a thread of the jar with any part of its edge, but the whole cap must be brought down on to the jar. Experience has shown, that the caps, with inadequate guidance, easily may come down obliquely on jars, which produces jars, which are not tight, and which must be rejected. During the continued movement ahead of the cap it will come into contact with the cam surface 57 and adjust the vertical position of said surface, and consequently also the vertical positions of the guide members 59, 60, so that the edges of the cap will move into the U-formed groove of the guide members 59, 60. As the cap enters the groove of the guide members 59, 60 the rear portion of the cap engages the chamfered surface 65' and allows the cap to be lowered during preliminary tightening resulting from the engagement of the cap with the friction member 61, which will slow down the speed of one side of the cap, so that the cap during the further passage of the jar will be preliminarily tightened.

Normally the spring 64 keeps the supporting arm 49 in a stable position, but in case an upside down turned cap appears, there will be a vertical strain, whereby the supporting arm 49 and thereto connected parts 45, 47, 51–68 will swing around the rotation axis of the shaft pivot 47 during the compression of the spring 64. In case the opening of a jar, being conveyed on the conveyor, is not located between the guide rails 45, these and thereto connected parts can be moved sidewards a bit through the sliding of the shaft pivot 47 in its attachment, so that an adjustment to the position of the opening of the jar will be provided.

Immediately after the preliminary tightening the jar will move under the device 4 for firmly tightening of the cap, which is located on the jar.

The lower parts of the guide rails 45 and the supporting arm 49 are vertically adjustable by the adjusting screw 63 and further the guide members 59, 60 are a little displaceable upwards against the action of the helical spring 55. Those parts of the apparatus, which for their proper function depend on a properly directed vertical position according to the height of the jars, will consequently be brought in the adequate vertical position in a very reliable and convenient way.

Although the invention has been illustrated in the drawings in only one embodiment, it is obvious that, especially the transmission means and other details, can be modified within the frame of the invention.

I claim:

1. Apparatus for guiding caps in a device for closing containers comprising:
   a conveyor for feeding filled containers through said device;
   means for supplying caps to the device from a supply of caps;
   means including a pair of spaced guide rails including a shoulder for guiding the caps to a junction where the caps are positioned on the container;
   a pair of stop and guiding pins each having a cylindrical portion and a conical portion mounted opposite to and spring biased toward each other and arranged to stop the caps from the cap supply with the stopped cap aligned for engagement by the container to be enclosed by said cap;
   said guide rail shoulders terminating at a position along the spaced guide rails upstream of said stop and guiding pins so that upon engagement of the leading edge of a cap by a container, upper sides of the caps drop below the pin centerline to be in engagement with the lower conical and cylindrical surfaces on said pins to thereby force the container top on said container;
   a pair of guide members located along opposite side edges of the caps as the container and caps advance beyond said stop and guiding pins;
   a cam surface mounted to move concomitantly with said guide members against the action of a spring about a horizontal pivot axis extending across the direction of travel of said containers with their respective caps;
   means including said cam surface for adjusting the vertical position of said guide members relative to the vertical position of said caps; and
   means for securing the caps which have been positioned on the containers.

2. Apparatus as defined in claim 1 further comprising:
   a friction member mounted on only one of said guide members, said friction member being spring biased to engage an outer surface of one side of said caps to rotate and preliminarily tighten said caps.

3. Apparatus for guiding caps in a device for closing containers comprising:
   a conveyor for feeding filled containers through said device;
   means for supplying caps to the device from a supply of caps;
   means including a shoulder guiding the caps to a junction where the caps are positioned on the containers including a pair of stop and guiding pins mounted opposite to and spring biased toward each other and arranged so that the caps for the cap supply are caused to stop, said pins each having a conical point allowing the caps, when positioned on a container, to pass therebetween, said shoulder being arranged to slidingly support the caps until stopped by said pins whereupon the cap leading edge drops into engagement with a container top after which the conical surfaces and the lower cylindrical surfaces of said stop and guiding pins are brought into engagement with the upper sides of said cap;
   a pair of guide surfaces mounted opposite each other and on opposite sides of said caps at a position closely adjacent to and downstream of said stop and guiding pins, the lower surfaces of said guide surfaces being on the same level as the lowermost cylindrical surfaces of said stop and guide pins, said guide surfaces being arranged to contribute to maintaining said caps in a horizontal position on said container; and
   means for securing the caps which have been positioned on the containers.

4. Apparatus for guiding caps in a device for closing containers comprising:
   a conveyor for feeding filled containers through said device;
   means for supplying caps to the device from a supply of caps;
   means including a shoulder guiding the caps to a junction where the caps are positioned on the containers including a pair of stop and guiding pins mounted opposite to and spring biased toward each other and arranged so that the caps from the cap supply are caused to stop, said pins each having a conical point allowing the caps, when positioned on a container, to pass therebetween, said shoulder being arranged to slidingly support the caps until stopped by said pins whereupon the cap leading edge drops into engagement with a container top after which the conical surfaces and the lower cylindrical surfaces of said stop and guiding pins are brought into engagement with the upper sides of said cap;

a pair of guide members located along opposite side edges of the caps when advancing beyond said stop and guiding pin;

a cam surface mounted to move concomitantly with said guide members against the action of a spring about a horizontal pivot axis extending across the direction of travel of said containers with their respective caps;

means including said cam surface for adjusting the vertical position of the guide members relative to the vertical position of said caps;

a guide plate located at the end of each said guide rails on opposite sides of said caps beneath said stop and guiding pins and beneath and downstream of said shoulder, said guide plates at the location near said guide members being provided with a chamfering which serves as a sliding surface for said caps and allows the caps to be lowered during preliminary tightening while the rear edge of the caps moves forwardly from the ends of the guide plates.

* * * * *